(12) United States Patent
Matsubara

(10) Patent No.: US 8,053,388 B2
(45) Date of Patent: Nov. 8, 2011

(54) CATALYST SUPPORT PARTICLE, EXHAUST GAS PURIFYING CATALYST, AND PRODUCTION PROCESSES THEREOF

(75) Inventor: Hiroyuki Matsubara, Shizuoka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 130 days.

(21) Appl. No.: 12/084,419

(22) PCT Filed: Nov. 1, 2006

(86) PCT No.: PCT/JP2006/322313
§ 371 (c)(1),
(2), (4) Date: May 1, 2008

(87) PCT Pub. No.: WO2007/052821
PCT Pub. Date: May 10, 2007

(65) Prior Publication Data
US 2009/0048102 A1 Feb. 19, 2009

(30) Foreign Application Priority Data

Nov. 4, 2005 (JP) .................................. 2005-321125
May 15, 2006 (JP) .................................. 2006-135643

(51) Int. Cl.
*B01J 23/10* (2006.01)
(52) U.S. Cl. ...................................................... 502/304
(58) Field of Classification Search .................. None
See application file for complete search history.

(56) References Cited

U.S. PATENT DOCUMENTS

| | | | | | |
|---|---|---|---|---|---|
| 3,867,312 | A | * | 2/1975 | Stephens | 502/302 |
| 3,993,572 | A | * | 11/1976 | Hindin et al. | 502/304 |
| 4,539,311 | A | * | 9/1985 | Harrison et al. | 502/304 |
| 4,996,031 | A | * | 2/1991 | Spooner et al. | 423/213.2 |
| 6,118,034 | A | * | 9/2000 | Vicari et al. | 585/262 |
| 6,150,288 | A | * | 11/2000 | Suzuki et al. | 501/105 |
| 6,540,968 | B1 | * | 4/2003 | Huang et al. | 423/213.5 |
| 6,635,599 | B1 | * | 10/2003 | Eijsbouts et al. | 502/305 |
| 6,762,147 | B2 | * | 7/2004 | Morikawa et al. | 502/242 |
| 2003/0045425 | A1 | * | 3/2003 | Ruth et al. | 502/325 |

FOREIGN PATENT DOCUMENTS

| | | |
|---|---|---|
| EP | 0 321 949 | 6/1989 |
| EP | 0 503 653 | 9/1992 |

(Continued)

OTHER PUBLICATIONS

Extended European Search Report for EP Appl. No. 06823217.2 dated Aug. 13, 2008.

*Primary Examiner* — Melvin Mayes
*Assistant Examiner* — Stefanie Cohen
(74) *Attorney, Agent, or Firm* — Finnegan, Henderson, Farabow, Garrett & Dunner, LLP

(57) ABSTRACT

Disclosed are a catalyst support particle comprising alumina having dispersed therein ceria primary particles, wherein a prominent peak of alumina is not present in the vicinity of $2\theta=67°$ in the X-ray diffraction analysis; an exhaust gas purifying catalyst obtained by loading a noble metal on the support particle; and production processes of the support catalyst and the exhaust gas purifying catalyst.

11 Claims, 11 Drawing Sheets

FOREIGN PATENT DOCUMENTS

| | | |
|---|---|---|
| EP | 0 602 865 | 6/1994 |
| EP | 1 175 935 | 1/2002 |
| JP | 8-131830 | 5/1996 |
| JP | 9-000925 | 1/1997 |
| JP | 11-130436 | 5/1999 |
| JP | 11-217220 | 8/1999 |
| JP | 2000-300989 | 10/2000 |
| JP | 3262044 | 12/2001 |
| JP | 2002-211908 | 7/2002 |
| JP | 2003-117393 | 4/2003 |
| JP | 2003-126694 | 5/2003 |
| JP | 2004-136179 | 5/2004 |
| JP | 2004-160435 | 6/2004 |
| JP | 2004-174490 | 6/2004 |
| JP | 2005-28334 | 2/2005 |
| WO | WO 2006/016633 | 2/2006 |
| WO | WO 2006/025613 | 3/2006 |
| WO | WO 2006/070201 | 7/2006 |

* cited by examiner

CATALYST SUPPORT PARTICLE, EXHAUST GAS PURIFYING CATALYST, AND PRODUCTION PROCESSES THEREOF

TECHNICAL FIELD

The present invention relates to a catalyst support particle containing ceria and alumina, an exhaust gas purifying catalyst obtained by loading platinum on the support, and production processes thereof.

BACKGROUND ART

Exhaust gas from an internal combustion engine such as an automobile engine contains nitrogen oxide ($NO_x$), carbon monoxide (CO), hydrocarbon (HC) and the like, which is generally released into the atmosphere after purification with an exhaust gas purifying catalyst capable of oxidizing CO and HC, and at the same time, reducing $NO_x$. Regarding exhaust gas purifying catalyst, a three-way catalyst is known in which a noble metal such as platinum (Pt), rhodium (Rh) and palladium (Pd) is supported on a porous metal oxide support such as γ-alumina.

The metal oxide support may be formed of various materials, but in order to obtain a large surface area, generally alumina has been used. However, in recent years, in order to accelerate the purification of an exhaust gas by using chemical properties of the support, it has been proposed to use various other materials such as ceria ($CeO_2$), zirconia ($ZrO_2$) and titanium ($TiO_2$) in combination with, or not in combination with, alumina.

For example, Kokai (Unexamined Japanese Patent Application) No. 9-925 discloses a catalyst particle having stacked therein a plurality of support material layers and specifically proposes, for example, a catalyst support particle having, in the periphery of a support particle of alumina, zirconia or silica working out to the core, a first layer comprising such a support material, on which platinum is supported, a second layer covering the first layer and comprising ceria, barium oxide or lanthanum oxide, a third layer covering the second layer and comprising a support material such as alumina, on which rhodium or lanthanum is supported, and a fourth layer covering the third layer and comprising a support material such as alumina, on which cerium, cobalt or the like is supported. According to Kokai No. 9-925, such a catalyst support is supposed to exhibit excellent $NO_x$ purifying performance when used as an exhaust gas purifying catalyst while supplying a reducing agent such as light oil.

In order to absorb the fluctuation of oxygen concentration in the exhaust gas and increase the exhaust gas purifying ability of the three-way catalyst, ceria having an oxygen storage capacity (OSC) of storing oxygen when the oxygen concentration in the exhaust gas is high, and releasing oxygen when the oxygen concentration in the exhaust gas is low, is used in the exhaust gas purifying catalyst.

In order to allow for efficient progress of oxidation of CO and HC and reduction of $NO_x$ by the activity of the three-way catalyst, the air-fuel ratio in the internal combustion engine must be a theoretical air-fuel ratio (stoichiometric air-fuel ratio). Therefore, a material having OSC is preferably used to absorb the fluctuation of oxygen concentration in the exhaust gas and maintain the oxygen concentration in the vicinity of the theoretical air-fuel ratio, so that the three-way catalyst can exert its exhaust gas purifying ability.

Various studies are being made on the use of ceria in an exhaust gas purifying catalyst, and it is also known to increase the OSC and heat resistance by forming a solid solution of ceria and zirconia (see, Kokai No. 2003-126694). For example, in Kokai Nos. 8-131830 and 2003-117393, a technique is proposed in which loading platinum on a support particle such as alumina and coating ceria or a ceria-zirconia solid solution on the platinum, thereby suppressing movement of the platinum during use of the catalyst as well as sintering caused by the movement.

According to recent studies, ceria is found to have not only OSC, but also by virtue of its strong affinity for a noble metal, particularly for platinum, the capability of preventing particle growth (sintering) of the noble metal supported thereon. When platinum is sintered during use of an exhaust gas purifying catalyst, active sites of the catalyst decrease and in turn, the efficiency in the oxidation and reduction of $NO_x$ is depressed. For this reason, it is very important to suppress the sintering of platinum.

In this way, ceria is important in terms of preventing platinum from sintering. However, ceria may undergo sintering, and the ceria itself sometimes becomes sintered, and thereby reduced in the effect of preventing sintering of platinum.

To solve this problem, Japanese Patent No. 3,262,044 discloses a catalyst support where at least either one particle of ceria and zirconia and an alumina particle are dispersed in a highly uniform manner, and a production method thereof. In Japanese Patent No. 3,262,044, such a catalyst support is obtained by mixing a salt solution containing at least either one salt of cerium and zirconia and an aluminum salt with an alkaline solution in a short time. In this catalyst support, at least either one particle of ceria and zirconia and an alumina particle are dispersed in a highly uniform manner and sintering of at least either one particle of ceria and zirconia is suppressed by an alumina particle between those particles.

According to the catalyst support particle and the production process thereof described in Japanese Patent No. 3,262,044 supra, sintering of ceria is effectively suppressed by the use of alumina. Under these circumstances, an object of the present invention is to provide a better catalyst support particle similarly by using alumina in a ceria-based catalyst support. Another object of the present invention is to provide a production process of the catalyst support particle and an exhaust gas purifying catalyst produced by using the catalyst support particle.

In the case of obtaining an exhaust gas purifying catalyst by loading platinum on this catalyst support particle, platinum cannot be loaded selectively on ceria and a large amount of platinum is supported also on alumina. The sintering preventing effect of ceria cannot be exerted on such platinum supported on alumina. Accordingly, still another object of the present invention is to provide an exhaust gas purifying catalyst capable of successfully exerting a sintering preventing effect of ceria on platinum while effectively suppressing sintering of ceria by the use of alumina, and a production process thereof.

DISCLOSURE OF THE INVENTION

The catalyst support particle of the present invention is a catalyst support particle comprising alumina having dispersed therein ceria primary particles, wherein a prominent peak of alumina is not present in the vicinity of 2θ=67° in the X-ray diffraction analysis. Namely, this is a catalyst support particle in which alumina is mainly present in an amorphous state.

According to the catalyst support particle of the present invention, the ceria primary particles are restricted in their movement by the amorphous-state alumina and isolated from each other, whereby sintering of the ceria primary particles can be suppressed. Particularly, in the catalyst support particle of the present invention, the alumina is in an amorphous state without having a distinct crystal structure, whereby ceria primary particle can be highly dispersed and held in the alumina.

The production process of a catalyst support particle of the present invention comprises adding and then mixing a salt solution, particularly an aqueous solution, containing a cerium salt and an aluminum salt, with an alkaline solution, particularly an aqueous solution, having a pH value more than 11, particularly 12, more particularly 13, to produce a precipitate containing cerium and alumina, and drying and then firing the obtained precipitate to obtain a catalyst support particle.

According to the production process of a catalyst support particle of the present invention, a catalyst support particle comprising alumina, particularly amorphous-state alumina, having dispersed therein ceria primary particles can be obtained.

In one embodiment of the production process of a catalyst support particle of the present invention, the salt solution and the alkaline solution can be mixed each in an amount allowing the mixed solution to have a final pH value of 9.0 to 10.8, particularly from 9.5 to 10.5.

According to this method, a catalyst support particle where ceria having a relatively small primary particle diameter is dispersed in alumina can be obtained.

The exhaust gas purifying catalyst of the present invention is obtained by loading platinum on the catalyst support particle of the present invention.

According to the exhaust gas purifying catalyst of the present invention, sintering of ceria primary particles is suppressed, whereby the effect of preventing sintering of platinum by ceria can be maintained in use even at a high temperature.

In one embodiment of the exhaust gas purifying catalyst of the present invention, platinum is supported on a ceria primary particle, so that sintering of platinum can be suppressed.

The process for producing this exhaust gas purifying catalyst of the present invention comprises the following steps:

adding and then mixing a salt solution, particularly an aqueous salt solution, containing a platinum salt, a cerium salt and an aluminum salt with an alkaline solution, particularly an aqueous alkaline solution, having a pH value more than 11, particularly 12, more particularly 13, to produce a precipitate containing platinum, cerium and alumina, and drying and then firing the obtained precipitate to obtain an exhaust gas purifying catalyst.

BEST MODE FOR CARRYING OUT THE INVENTION

Figure 1:
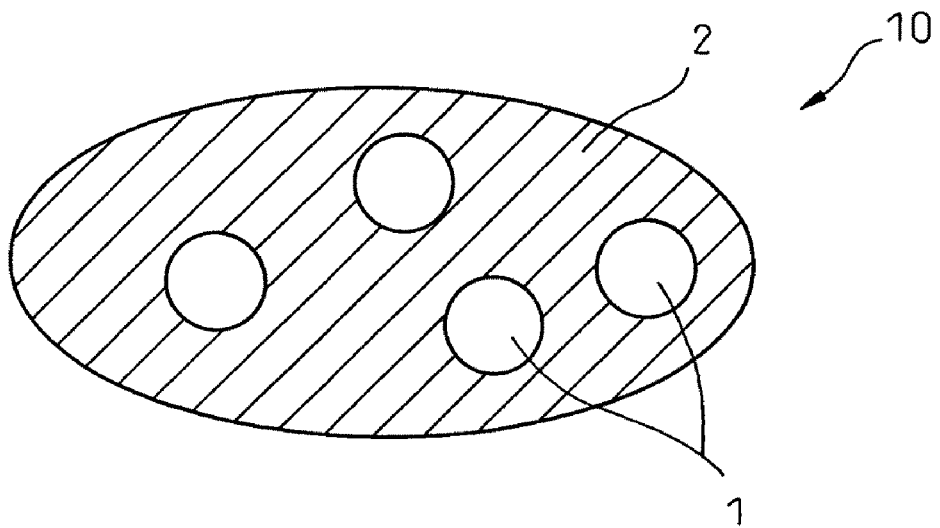
FIG. 1 is a conceptual view of the catalyst support particle of the present invention.
Figure 2:
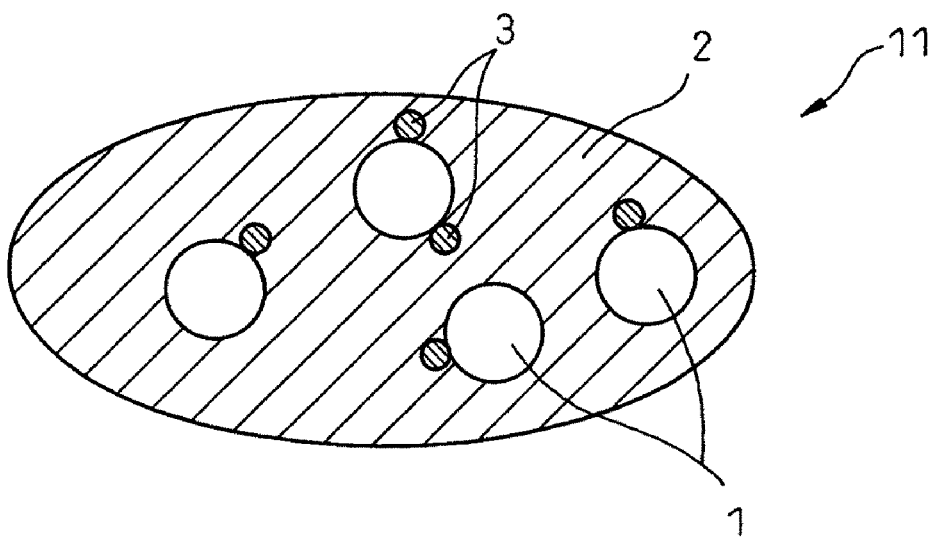
FIG. 2 is a conceptual view of the exhaust gas purifying catalyst of the present invention.

The present invention is described below by referring to FIGS. 1 and 2. FIG. 1 is a conceptual view of the catalyst support particle of the present invention, and FIG. 2 is a conceptual view of the exhaust gas purifying catalyst of the present invention.

As shown in FIG. 1, in the catalyst support particle 10 of the present invention, ceria primary particles 1 are dispersed in alumina, particularly amorphous-state alumina 2. The exhaust gas purifying catalyst is obtained by loading platinum on such a catalyst support particle. Preferably, as shown in FIG. 2, the exhaust gas purifying catalyst 11 of the present invention is obtained by loading a platinum particle 3 on the ceria primary particle 1. When the alumina is present in an amorphous sate in the catalyst support particle of the present invention, this can be confirmed by the X-ray diffraction analysis and is indicated, for example, by the fact that the support does not have a prominent peak of alumina in the vicinity of $2\theta=67°$.

The catalyst support particle 10 of the present invention may contain ceria and alumina at an arbitrary ratio, and the ratio between ceria and alumina in the support particle is preferably selected such that sintering of platinum is suppressed by the affinity of ceria for platinum while allowing alumina to suppress sintering of ceria. Accordingly, for example, the ratio between ceria and alumina in this support may be, in terms of mass ratio of ceria ($CeO_2$):alumina ($Al_2O_3$), from 10:90 to 60:40, particularly from 15:85 to 55:45, more particularly from 20:80 to 50:50.

Incidentally, this support particle may also contain components other than ceria and alumina, and particularly, when at least either one of ceria and alumina contains an additive element selected from the group consisting of an alkali metal, an alkaline earth metal and a rare earth metal, the heat resistance can be improved.

In the catalyst support particle of the present invention, ceria primary particles are dispersed in alumina, whereby sintering of ceria can be suppressed. Accordingly, for example, in the catalyst support particle of the present invention, the average ceria particle diameter after heating in air at 800° C. over 5 hours may be 10 nm or less, particularly 7 nm or less, more particularly 6 nm or less.

In the exhaust gas purifying catalyst of the present invention, platinum is supported preferentially on the ceria primary particle, whereby sintering of platinum can be suppressed. For example, in the exhaust gas purifying catalyst of the present invention, the average platinum particle diameter after heating in air at 800° C. over 5 hours may be 5 nm or less, particularly 4 nm or less, more particularly 3 nm or less.

Incidentally, the exhaust gas purifying catalyst can be used also as an $NO_x$ storing/reducing catalyst by further loading an $NO_x$ storing element selected from an alkali metal and an alkaline earth metal, particularly barium and potassium.

Figure 3:
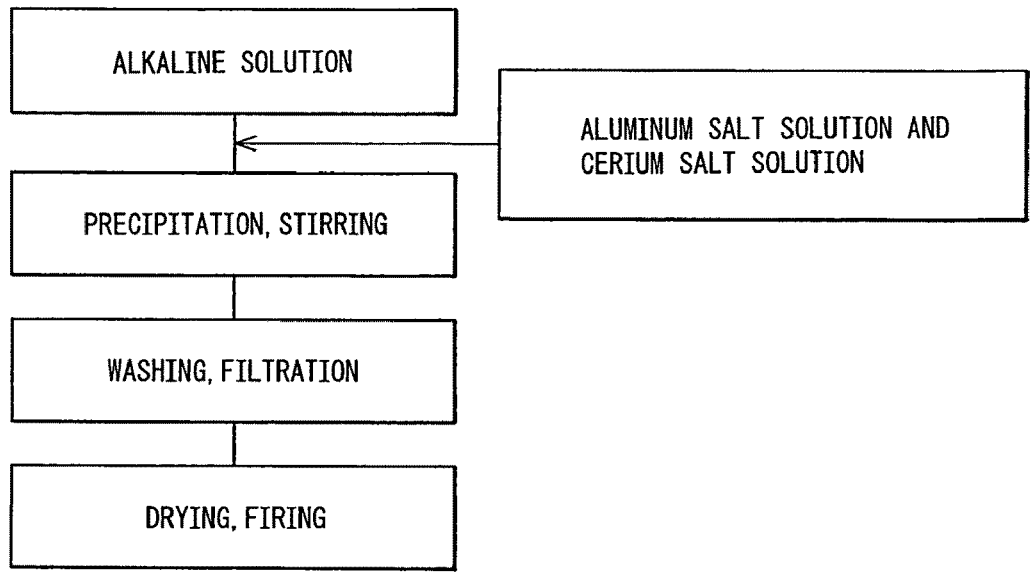
FIG. 3 is a view explaining the production process of a catalyst support particle of the present invention.

The catalyst support particle of the present invention may be obtained by an arbitrary method but can be obtained, for example, by the process of the present invention for producing a catalyst support particle. In the process of the present invention, for example, as shown in FIG. 3, a salt solution containing a cerium salt and an aluminum salt is added to an alkaline solution within a predetermined time and mixed to produce a precipitate, and the obtained precipitate is optionally washed and filtered and then is dried and fired. In other words, in this process, by adding a salt solution containing cerium and aluminum to an alkaline solution, the pH of the mixed solution of the alkaline solution and the salt solution is changed from a large value to a small value and a precipitate is thereby produced.

When the pH of the mixed solution of the alkaline solution and the salt solution is changed from a large value to a small value in this way, cerium is first precipitated and aluminum is then precipitated, whereby the catalyst support particle of the present invention is obtained. This mechanism is described below by referring to FIG. 4.

Figure 4:
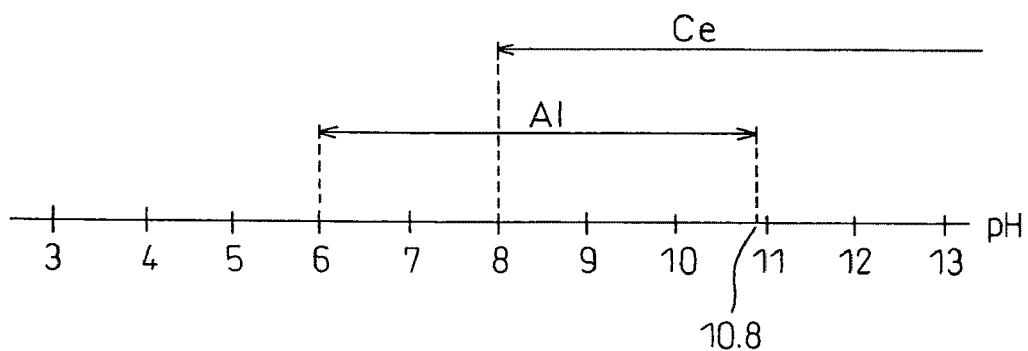
FIG. 4 is a view showing the pH range in which a ceria precursor and an aluminum precursor are precipitated.

As shown in FIG. 4, cerium and aluminum differ from each other in the pH at which cerium or aluminum forms a hydroxide from the aqueous solution and precipitates. Cerium forms a precipitate at a pH of about 8 or more, and aluminum forms a precipitate at a pH of about 6 to 10.8. Accordingly, when an acidic salt solution is added to an alkaline solution as in the process of the present invention, the mixed solution initially has a pH of substantially the alkaline solution and along with addition of the acidic salt solution, the pH value becomes small, as a result, cerium hydroxide is first precipitated and aluminum hydroxide is then precipitated, whereby the catalyst support particle of the present invention is obtained.

On the other hand, if the alkaline solution is added to the acidic salt solution, the mixed solution initially has a pH value of substantially the acidic salt solution and along with the addition of the alkaline solution, the pH value becomes large. Accordingly, in this case, aluminum hydroxide is first precipitated and cerium hydroxide is then precipitated. If alumina hydroxide is first precipitated in this way, particularly when the alumina content in the catalyst support particle is high and the ceria content is low, the aluminum hydroxide forms a relatively large aggregated lump before the aggregation of ceria starts, and this makes it difficult to disperse ceria in the alumina.

The steps in the processes of the present invention for producing a catalyst support particle and an exhaust gas purifying catalyst are described in greater detail below.

In the process of the present invention for producing a catalyst support, a salt solution, particularly an aqueous salt solution, containing a cerium salt and an aluminum salt is added to and mixed with an alkaline solution, particularly an aqueous alkaline solution, having a pH value more than 11, particularly 12, more particularly 13, to produce a precipitate, particularly a hydroxide, containing cerium or aluminum.

The addition of the salt solution to the alkaline solution is performed such that a ceria precursor is first precipitated and an alumina precursor is then precipitated. Accordingly, the addition of the salt solution to the alkaline solution may be performed over a predetermined time, for example, the salt solution may be added to the alkaline solution over 10 seconds to 10 minutes, particularly over 3 to 8 minutes, more particularly over 3 to 7 minutes.

The addition of the salt solution to the alkaline solution may be performed by adjusting the amount such that the mixed solution has a final pH value of 9.0 to 10.8, particularly from 9.5 to 10.5.

Furthermore, the addition of the salt solution to the alkaline solution may be performed within 2 minutes, particularly within from 10 seconds to 1 minute, after the start of addition of the salt solution, such that the mixed solution can achieve a pH value smaller than 10.8.

As for the salts of cerium and aluminum, which can be used here, an arbitrary salt capable of generating a metal ion when dissolved in a medium such as water can be used. Accordingly, these salts may have the same group or different groups. In the case of using an aqueous salt solution of such a metal, the salt solution is generally set to have an acidic pH value and thereby stabilized not to allow for precipitation of a metal hydroxide. For example, the metal salt which can be used is a chloride salt, a nitrate salt, an oxynitrate salt or an acetate salt, particularly a nitrate salt.

Examples of the alkaline solution which can be used here include an aqueous solution of an alkali metal or alkaline earth metal hydroxide such as sodium hydroxide, aqueous ammonia, and an aqueous urea solution. Aqueous ammonia and urea are preferred, because these can be easily removed by heating.

An arbitrary mixing device such as stirrer may be used so that this mixing for bringing about precipitation can be achieved within a predetermined time.

In the process of the present invention for producing a catalyst support particle, the obtained aggregate is dried and fired. Before the drying and firing, filtration and washing may be optionally performed. This washing can be performed with water, a lower alcohol or the like.

The removal and drying of the solvent component from the aggregate may be performed by an arbitrary method at an arbitrary temperature and can be achieved, for example, by placing the aggregate in an oven at 100 to 300° C. The raw material obtained in this way by removing and drying the solvent component from the aggregate is fired, whereby a catalyst support particle can be obtained. The firing can be performed at a temperature generally employed in the synthesis of a metal oxide, for example, at 250 to 600° C.

In the case of obtaining an exhaust gas purifying catalyst by loading a noble metal, particularly platinum, on the catalyst support particle of the present invention, this can be achieved by dispersing the catalyst support particle of the present invention in a noble metal salt-containing solution, stirring and then filtering the resulting liquid dispersion, and drying and firing the obtained particle. The amount of the noble metal loaded on the catalyst support particle may be, for example, from 0.01 to 5 mass %, particularly from 0.1 to 2 mass %, based on the catalyst support particle.

In the case of further loading an $NO_x$ storing element such as alkali metal or alkaline earth metal, particularly barium or potassium, on the catalyst support particle having loaded thereon a noble metal, this can be achieved by dispersing the catalyst support particle in a solution containing a salt of such a metal, stirring and then filtering the resulting liquid dispersion, and drying and firing the obtained particle. The amount of the $NO_x$ storing element loaded on the catalyst support particle may be, for example, from 0.01 to 5 mass %, particularly from 0.1 to 2 mass %, based on the catalyst support particle.

Incidentally, the catalyst support particle and exhaust gas purifying catalyst of the present invention each can be used not only by forming the particle or catalyst itself but also by mixing it with another support particle such as alumina and may also be used by coating it on a monolith support, for example, a ceramic honeycomb monolith.

As for the exhaust gas purifying catalyst of the present invention, the preferred exhaust gas purifying catalyst of the present invention where platinum is supported preferentially on a ceria primary particle can be produced by adding a platinum salt to a salt solution containing a cerium salt and an aluminum salt in the above-described production process of a catalyst support particle. The pH value at which platinum ion forms a hydroxide or the like from the aqueous solution and precipitates is about 7 or more. When the acidic salt solution is added to an alkaline solution, the mixed solution initially has a pH of substantially the alkaline solution and along with addition of the acidic salt solution, the pH value becomes small, as a result, platinum and a cerium precursor are first precipitated to provide a state of a platinum particle being supported on a ceria precursor particle, and an aluminum precursor is then precipitated in the periphery of the platinum-supporting ceria precursor. The thus-obtained precipitate is dried and fired, whereby the exhaust gas purifying catalyst of the present invention in which platinum-supporting ceria primary particles are dispersed in alumina can be obtained.

The platinum salt which can be used in the present invention includes dinitrodiammine platinum, tetrachloroplatinum, hexachloroplatinum, platinum nitrate and tetraamminedichloroplatinum. Such a platinum salt can be stabilized in an acidic solution, for example, in an aqueous nitric acid solution. Accordingly, the dinitrodiammineplatinum can be used in the form of an aqueous dinitrodiammineplatinum nitrate solution.

The preferred combination of a platinum salt, a cerium salt and an aluminum salt for use in the present invention includes a combination of dinitrodiammineplatinum, cerium nitrate and aluminum nitrate. This combination is preferred because the salts or complexes all are stabilized in an aqueous nitric acid solution.

In the case of further loading a catalyst metal other than platinum, for example, a noble metal such as rhodium or palladium, on the exhaust gas purifying catalyst of the present invention, this can be achieved by dispersing the exhaust gas purifying catalyst in a noble metal salt-containing solution, stirring and filtering the resulting liquid dispersion, and drying and firing the obtained particle. A salt of such a catalyst metal other than platinum may be further incorporated into the salt solution containing a platinum salt and the like and loaded on ceria and/or alumina at the same time with the loading of platinum, and the amount of the noble metal loaded on the catalyst support particle may be, for example, from 0.01 to 5 mass %, particularly from 0.1 to 2 mass %, based on the catalyst support particle.

EXAMPLES

The present invention is described below by referring to Examples, but the present invention is not limited thereto.

Example 1

An aqueous dinitrodiammineplatinum nitrate solution (platinum concentration: 4.4 mass %) (45 g), 16.3 g of cerium nitrate nonaxahydrate and 234.5 g of aluminum nitrate nonahydrate were dissolved in 1,000 ml of ion exchanged water, and the resulting solution was stirred over 1 hour to obtain a salt solution. Separately, 800 ml of ion exchanged water and 170 ml of 28% aqueous ammonia were mixed to obtain an alkaline solution at a pH of about 12.5. Subsequently, the salt solution obtained above was added to the alkaline solution within 0.03 minutes while maintaining the mixed solution at a pH of 9 or more, to obtain a precipitate mainly composed of a hydroxide. At this time, the final pH of the mixed solution was 9.5. The thus-obtained precipitate was filtered, washed, dried at 250° C. over 2 hours and fired at 500° C. over 2 hours to obtain the exhaust gas purifying catalyst of Example 1. In this catalyst support particle of Example 1, the mass ratio of $Al_2O_3$:$CeO_2$ was 83.1:16.9.

Examples 2 to 5

Exhaust gas purifying catalysts of Examples 2 to 5 were obtained in the same manner as in Example 1, except that the salt solution was added to the alkaline solution over 3 minutes, 5 minutes, 8 minutes and 10 minutes, respectively.

Examples 6 to 10

The catalyst support particles of Examples 6 to 10 were obtained in the same manner as in Examples 1 to 5, respectively, except for not adding the aqueous dinitrodiammineplatinum nitrate solution to the salt solution. Separately, 45 g of an aqueous dinitrodiammineplatinum nitrate solution (platinum concentration: 4.4 mass %) was added to 500 ml of ion exchanged water to obtain a platinum solution. The catalyst support particles of Example 6 to 10 obtained above each was dipped in this platinum solution, stirred over 2 hours, dried at 120° C. over 2 hours and fired at 500° C. over 2 hours to obtain the exhaust gas purifying catalysts of Examples 6 to 10.

(Ceria Particle Diameter)

Figure 5:
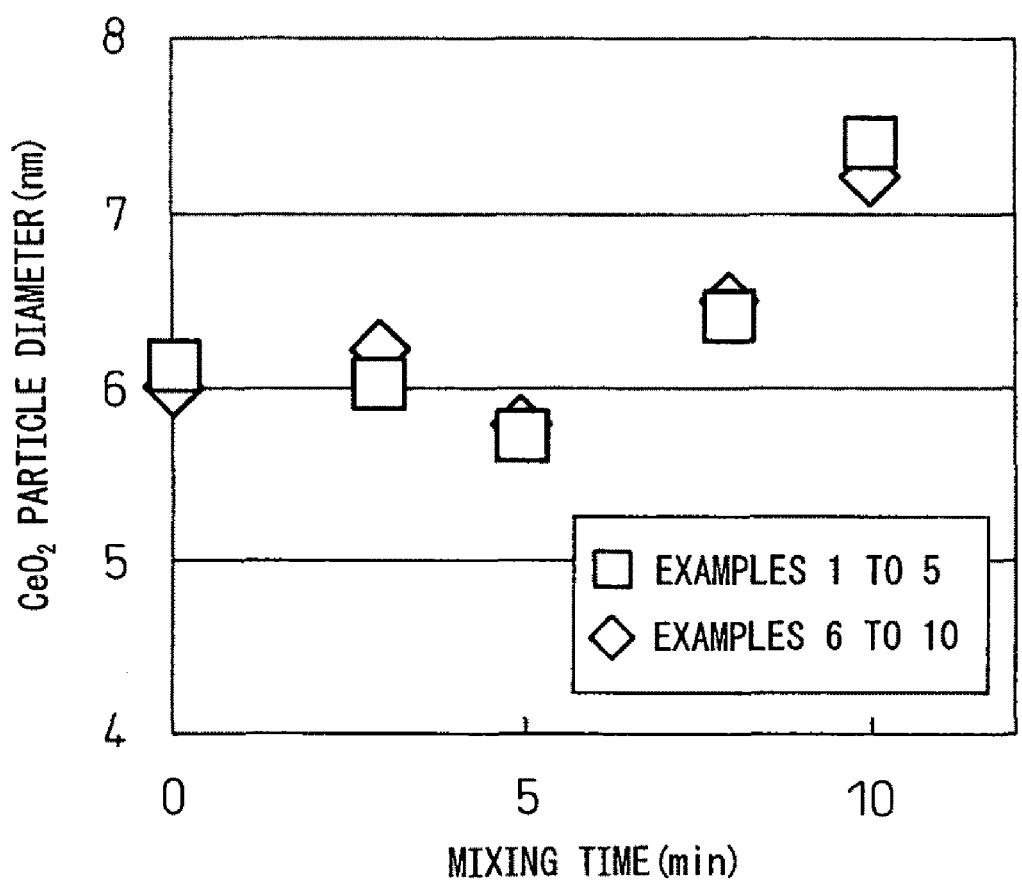
FIG. 5 is a view showing the ceria particle diameters of the catalyst support particles of Examples after endurance.

The catalyst support particles of Examples 1 to 10 were subjected to endurance under heating in an electric furnace at 800° C. over 5 hours and thereafter, evaluated for the ceria particle diameter. In the evaluation of ceria particle diameter here, an X-ray diffraction (XRD) analysis was used. FIG. 5 shows the evaluation results of ceria particle diameter.

As seen from FIG. 5, in Examples 1 to 5 where platinum is incorporated into the salt solution and in Example 6 to 10 where platinum is not incorporated into the salt solution, exhaust gas purifying catalysts having the same ceria particle diameter are obtained. That is, it is understood that in Examples 1 to 5 and Examples 6 to 10, the same ceria-alumina support is formed.

(Platinum Particle Diameter)

Figure 6:
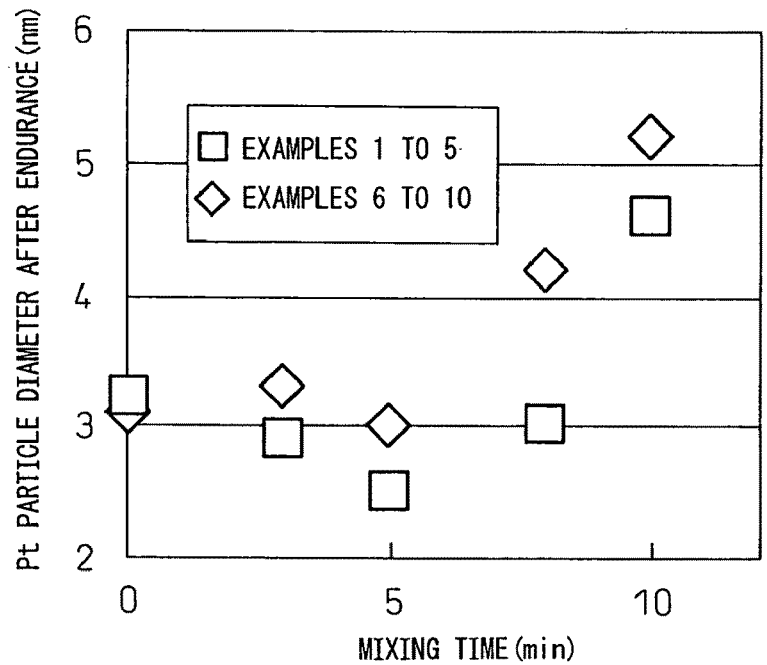
FIG. 6 is a view showing the platinum particle diameters of the catalyst support particles of Examples after endurance.

Similarly to the evaluation of the ceria particle diameter, the catalyst support particles of Examples, which were subjected to endurance under heating in an electric furnace at 800° C. over 5 hours, were evaluated for the platinum particle diameter. The platinum particle diameter was calculated by a CO pulse apparatus utilizing a property such that carbon monoxide (CO) uniformly adsorbs only to platinum. FIG. 6 shows the evaluation results of platinum particle diameter.

As seen from FIGS. 5 and 6, despite formation of the same ceria-alumina support in Examples 1 to 5 and Example 6 to 10, the exhaust gas purifying catalysts of Examples 1 to 5 maintain a small platinum particle diameter even after endurance, as compared with the exhaust gas purifying catalysts of Examples 6 to 10, because in the exhaust gas purifying catalysts of Examples 1 to 5, platinum is supported preferentially on ceria and the movement and particle growth of platinum due to endurance are thereby suppressed.

Out of Examples 1 to 5, good results are obtained in Examples 2 to 5 where the mixing time is more than 3 minutes, as compared with Examples 6 to 10, because when the mixing time is extremely short, platinum, a ceria precursor and an alumina precursor are precipitated substantially at the same time and a structure where platinum is supported preferentially on a ceria precursor can be hardly obtained. Furthermore, in Example 5 where the mixing time is 10 minutes, the ceria particle diameter and platinum particle diameter after endurance are relatively increased, because the period in which only platinum and a ceria precursor are precipitated is long to allow for aggregation of the platinum and ceria precursor and a structure where platinum-supporting ceria primary particles are dispersed in alumina can be hardly obtained.

($NO_x$ Purification Percentage)

In order to evaluate the performance after endurance of the exhaust gas purification catalysts of Examples, 150 g of each exhaust gas purifying catalyst of Examples 3 and 8 (mixing time: 5 minutes) was dipped in a solution prepared by charging 38.3 g of barium acetate into 500 ml of ion exchanged water, stirred over 2 hours, dried at 120° C. for 2 hours and fired at 500° C. for 5 hours, thereby loading barium, to obtain the exhaust gas purifying catalysts of Example 3 and 8 for the evaluation of $NO_x$ purification percentage. Thereafter, the exhaust gas purifying catalysts of Examples 3 and 8 for the evaluation of $NO_x$ purification percentage each was formed into a 1 mm-square pellet shape, and similarly to the evaluation of ceria particle diameter, subjected to endurance under heating in an electric furnace at 800° C. over 5 hours.

A rich gas having the composition shown in Table 1 below was fed at 600° C. for 10 minutes to the exhaust gas purifying catalysts of Examples 3 and 8, subjected to endurance and thereafter, a rich gas and a lean gas each having a composition shown in Table 1 below were fed at 400° C. by switching the gases at intervals of one minute.

TABLE 1

Gas Composition for Evaluation of $NO_x$ Purification Percentage

| | $CO_2$ (%) | $O_2$ (%) | CO (%) | $C_3H_6$ (ppm) | NO (ppm) | $H_2O$ (%) | $N_2$ (—) |
|---|---|---|---|---|---|---|---|
| Rich Gas | 10 | 0.4 | 0.1 | 667 | 500 | 2 | balance |
| Lean Gas | 10 | 6.5 | 0.6 | 667 | 500 | 2 | balance |

Figure 7:
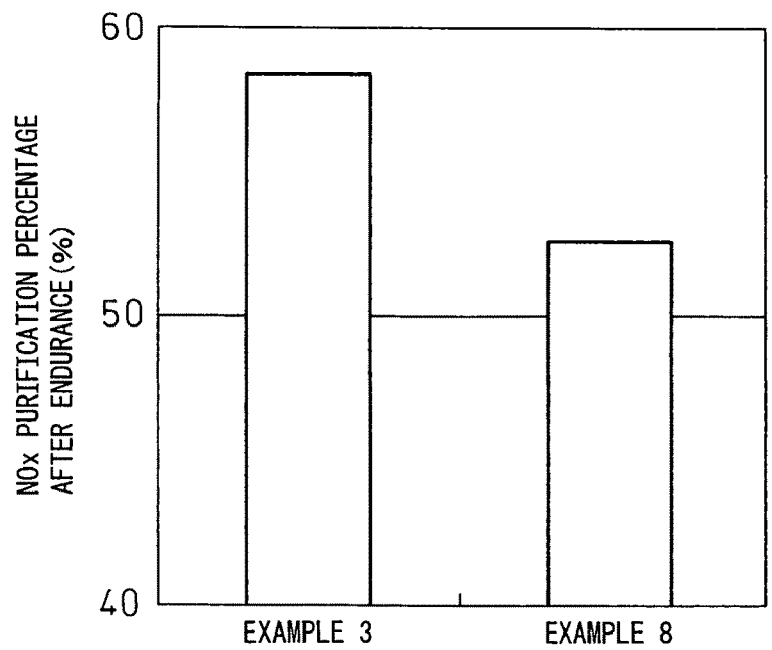
FIG. 7 is a view showing the $NO_x$ purifying performance of the exhaust gas purifying catalysts of Examples after endurance.

FIG. 7 shows the $NO_x$ purification percentage when the rich gas and the lean gas are fed by switching the gases. As seen from FIG. 7, the exhaust gas purifying catalyst of Example 3 is improved in the $NO_x$ purification percentage as compared with the exhaust gas purifying catalyst of Example 8, because in the exhaust gas purifying catalyst of Example 3, platinum is supported preferentially on ceria and sintering of the platinum during endurance is thereby suppressed.

In the following, the Examples are the same as the present invention, except that the salt solution does not contain a platinum salt, and Comparative Examples for these Examples are described below. These Examples and Comparative Examples are performed to demonstrate that in the exhaust gas purifying catalyst obtained by the process of the present invention, ceria primary particles are dispersed in alumina, particularly amorphous-state alumina.

Example 11

Cerium nitrate hexahydrate (5.2 g) and 234.5 g of aluminum nitrate nonahydrate were dissolved in 1,000 ml of ion exchanged water, and the resulting solution was stirred over 1 hour to obtain a salt solution. Subsequently, this salt solution was added at once to aqueous ammonia at a pH of about 12.5 such that the final pH of the mixed solution became 9.5, whereby a precipitate which is a hydroxide was obtained. The thus-obtained precipitate was filtered, washed, dried at 250° C. over 2 hours and fired at 500° C. over 2 hours to obtain a catalyst support particle of Reference Example 6. In the catalyst support particle of Reference Example 6, the mass ratio of $Al_2O_3$:$CeO_2$ was 93.9:6.1.

Thereafter, 150 g of the thus-obtained catalyst support particle of Example 11 was dipped in an aqueous solution prepared by charging an aqueous dinitrodiammineplatinum nitrate solution containing 2 g of platinum into 500 ml of ion exchange water and stirred over 2 hours. The resulting aqueous solution was dried at 120° C. over 2 hours and fired at 300° C. over 1 hour, thereby loading platinum on the catalyst support particle of Example 11. This platinum-supporting catalyst support particle of Example 11 was further dipped in a solution prepared by charging 38.3 g of barium acetate into 500 ml of ion exchanged water, stirred over 2 hours, dried at 120° C. over 2 hours and fired at 500° C. over 5 hours, thereby loading barium, to obtain an exhaust gas purifying catalyst of Example 11.

Examples 12 to 16

The catalyst support particles of Examples 12 to 16 were obtained in the same manner as in Example 11, except that the amounts of cerium nitrate hexahydrate and aluminum nitrate nonahydrate contained in the salt solution were changed to the amounts shown in Table 2 below. The mass ratio between $Al_2O_3$ and $CeO_2$ in these catalyst support particles of Examples 12 to 16 is also shown in Table 2 below. Furthermore, platinum and barium were loaded on the catalyst support particles of Examples 12 to 16 in the same manner as in Example 11 to obtain the exhaust gas purifying catalysts of Examples 12 to 16.

TABLE 2

Catalyst Support Particles of Reference Examples 6 to 11

| | Raw Material | | Support Composition | |
|---|---|---|---|---|
| | Aluminum Nitrate Nonahydrate (g) | Cerium Nitrate Hexahydrate (g) | $Al_2O_3$ (mass %) | $CeO_2$ (mass %) |
| Example 11 | 234.5 | 5.2 | 93.9 | 6.1 |
| Example 12 | 234.5 | 16.3 | 83.1 | 16.9 |
| Example 13 | 234.5 | 32.9 | 71.0 | 29.0 |

TABLE 2-continued

Catalyst Support Particles of Reference Examples 6 to 11

| | Raw Material | | Support Composition | |
|---|---|---|---|---|
| | Aluminum Nitrate Nonahydrate (g) | Cerium Nitrate Hexahydrate (g) | $Al_2O_3$ (mass %) | $CeO_2$ (mass %) |
| Example 14 | 234.5 | 45.4 | 63.9 | 36.1 |
| Example 15 | 234.5 | 80.5 | 50.0 | 50.0 |
| Example 16 | 234.5 | 120.7 | 40.0 | 60.0 |

Comparative Example 1

Cerium nitrate hexahydrate (16.9 g) and 234.5 g of aluminum nitrate nonahydrate were dissolved in 1,000 ml of ion exchanged water, and the resulting solution was stirred over 1 hour to obtain a salt solution. Subsequently, aqueous ammonia at a pH of about 12.5 was added at once to this salt solution such that the final pH of the mixed solution became 9.5, whereby a precipitate which is a hydroxide was obtained. The thus-obtained precipitate was filtered, washed, dried at 250° C. over 2 hours and fired at 500° C. over 2 hours to obtain the catalyst support particle of Comparative Example 1. In this catalyst support particle of Comparative Example 1, the mass ratio of $Al_2O_3:CeO_2$ was 83.1:16.9.

Furthermore, platinum and barium were loaded on the thus-obtained catalyst support particle of Comparative Example 1 in the same manner as in Example 11 to obtain the exhaust gas purifying catalyst of Comparative Example 1.

Comparative Examples 2 to 4

The catalyst support particles of Comparative Examples 2 to 4 were obtained in the same manner as in Comparative Example 1 except that the amounts of cerium nitrate hexahydrate and aluminum nitrate nonahydrate contained in the salt solution were changed to the amounts shown in Table 3 below. The mass ratio between $Al_2O_3$ and $CeO_2$ in these catalyst support particles of Comparative Examples 2 to 4 is also shown in Table 3 below. Furthermore, platinum and barium were loaded on the catalyst support particles of Comparative Examples 2 to 4 in the same manner as in Example 11 to obtain the exhaust gas purifying catalysts of Comparative Examples 2 to 4.

TABLE 3

Catalyst Support Particles of Comparative Examples 1 to 4

| | Raw Material | | Support Composition | |
|---|---|---|---|---|
| | Aluminum Nitrate Nonahydrate (g) | Cerium Nitrate Hexahydrate (g) | $Al_2O_3$ (mass %) | $CeO_2$ (mass %) |
| Comparative Example 1 | 234.5 | 16.3 | 83.1 | 16.9 |
| Comparative Example 2 | 234.5 | 32.9 | 71.0 | 29.0 |
| Comparative Example 3 | 234.5 | 45.4 | 63.9 | 36.1 |
| Comparative Example 4 | 234.5 | 80.5 | 50.0 | 50.0 |

Comparative Example 5

The catalyst support particle of Comparative Example 5 was obtained by mixing 166 g of an alumina particle having a high specific surface area and 34 g of a ceria particle and firing the mixture at 500° C. over 2 hours. In the catalyst support particle of Comparative Example 5, the mass ratio of $Al_2O_3:CeO_2$ was 83.0:17.0. Furthermore, platinum and barium were loaded on the thus-obtained catalyst support particle of Comparative Example 5 in the same manner as in Example 11 to obtain the exhaust gas purifying catalyst of Comparative Example 5.

Comparative Examples 6 to 8

The catalyst support particles of Comparative Examples 6 to 8 were obtained in the same manner as in Comparative Example 5, except for mixing an alumina particle having a high specific surface area and a ceria particle at a ratio shown in Table 4 below. The mass ratio between $Al_2O_3$ and $CeO_2$ in these catalyst support particles of Comparative Examples 6 to 8 is also shown in Table 4 below. Furthermore, platinum and barium were loaded on these catalyst support particles of Comparative Examples 6 to 8 in the same manner as in Example 11 to obtain the exhaust gas purifying catalysts of Comparative Examples 6 to 8.

TABLE 4

Catalyst Support Particles of Comparative Examples 5 to 8

| | Raw Material | | Support Composition | |
|---|---|---|---|---|
| | $Al_2O_3$ Powder (g) | $CeO_2$ Powder (g) | $Al_2O_3$ (mass %) | $CeO_2$ (mass %) |
| Comparative Example 5 | 166 | 34 | 83.0 | 17.0 |
| Comparative Example 6 | 142 | 58 | 71.0 | 29.0 |
| Comparative Example 7 | 128 | 72 | 64.0 | 36.0 |
| Comparative Example 8 | 100 | 100 | 50.0 | 50.0 |

Evaluation (Evaluation by Transmission Electron Microscope)

Figure 8:
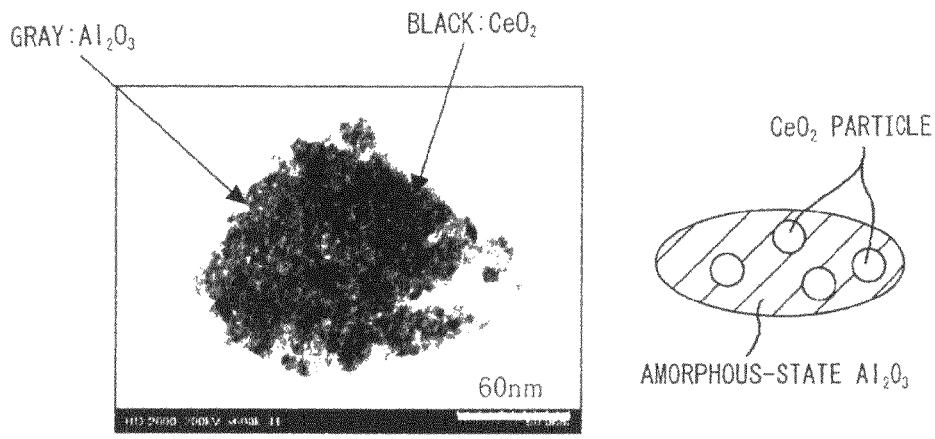
FIG. 8a is a TEM photograph of the catalyst support particle of Example 12.
FIG. 8b is a conceptual view of the catalyst support particle of Example 12.
Figure 9:
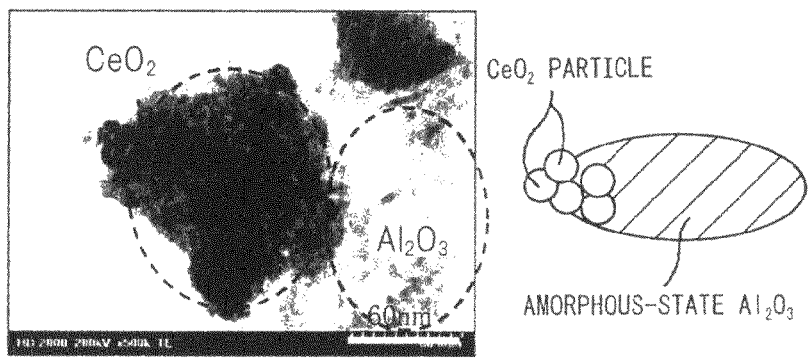
FIG. 9a is a TEM photograph of the catalyst support particle of Comparative Example 1.
FIG. 9b is a conceptual view of the catalyst support particle of Comparative Example 1.
Figure 10:
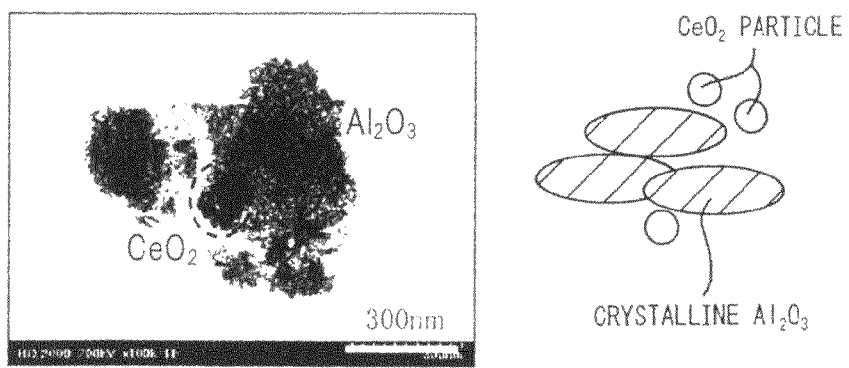
FIG. 10a is a TEM photograph of the catalyst support particle of Comparative Example 5.
FIG. 10b is a conceptual view of the catalyst support particle of Comparative Example 5.

The catalyst support particles of Example 12 and Comparative Example 1 and 5 were observed using a transmission electron microscope (TEM). FIGS. 8a, 9a and 10a each shows the image by TEM, and FIGS. 8b, 9b and 10b each is a schematic view showing the structure of the catalyst support particle, which is understood from the image. Here, in all of the catalyst support particles of these Reference Examples and Comparative Examples, the mass ratio of $Al_2O_3:CeO_2$ is about 83:17.

As seen from FIGS. 8a and 8b, in the catalyst support particle of Example 12, ceria particles are dispersed and held in the amorphous-state alumina. On the other hand, in the catalyst support particle of Comparative Example 1 shown in FIGS. 9a and 9b, a part of alumina particles are mutually mixed with ceria particles, but the majority of alumina is aggregated with each other, because an alumina precursor as the main component constituting the support is precipitated earlier than a ceria precursor and the alumina precursors are aggregated with each other before the ceria precursor is precipitated.

As seen from FIGS. 10a and 10b, in the catalyst support particle of Comparative Example 5, despite performing the firing at a temperature of 500° C. after mixing a high surface-area ceria particle and a high surface-area alumina particle, ceria and alumina appear as distinctly different phases. The alumina component in the catalyst support particles of Example 12 and Comparative Example 1 is amorphous-state alumina, whereas the alumina component in this catalyst support particle of Comparative Example 5 is crystalline alumina.

(Evaluation by X-Ray Diffraction Analysis)

Figure 11:
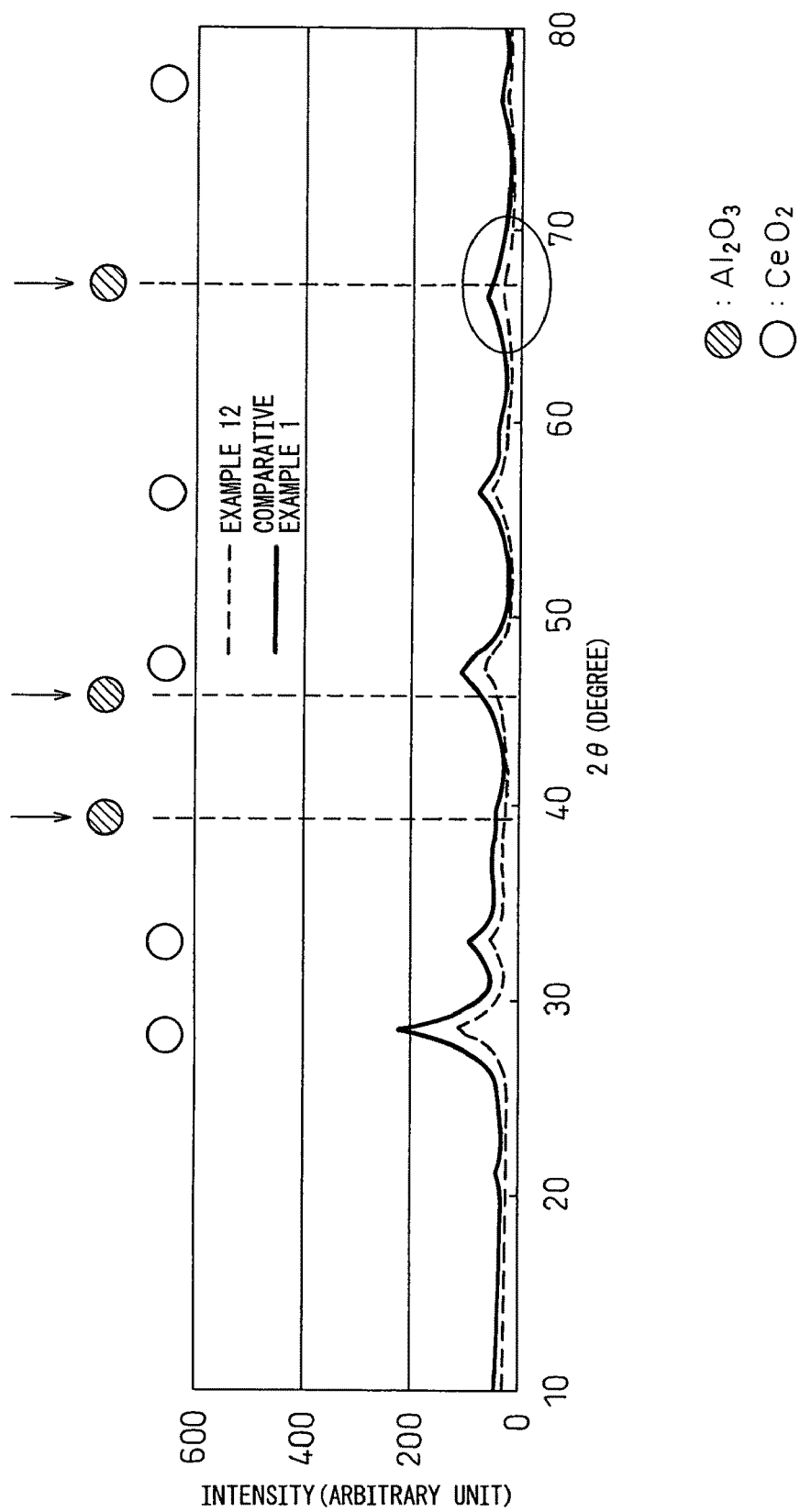
FIG. 11 is a view showing the XRD results of the catalyst support particles of Example 12 and Comparative Example 1.
Figure 12:
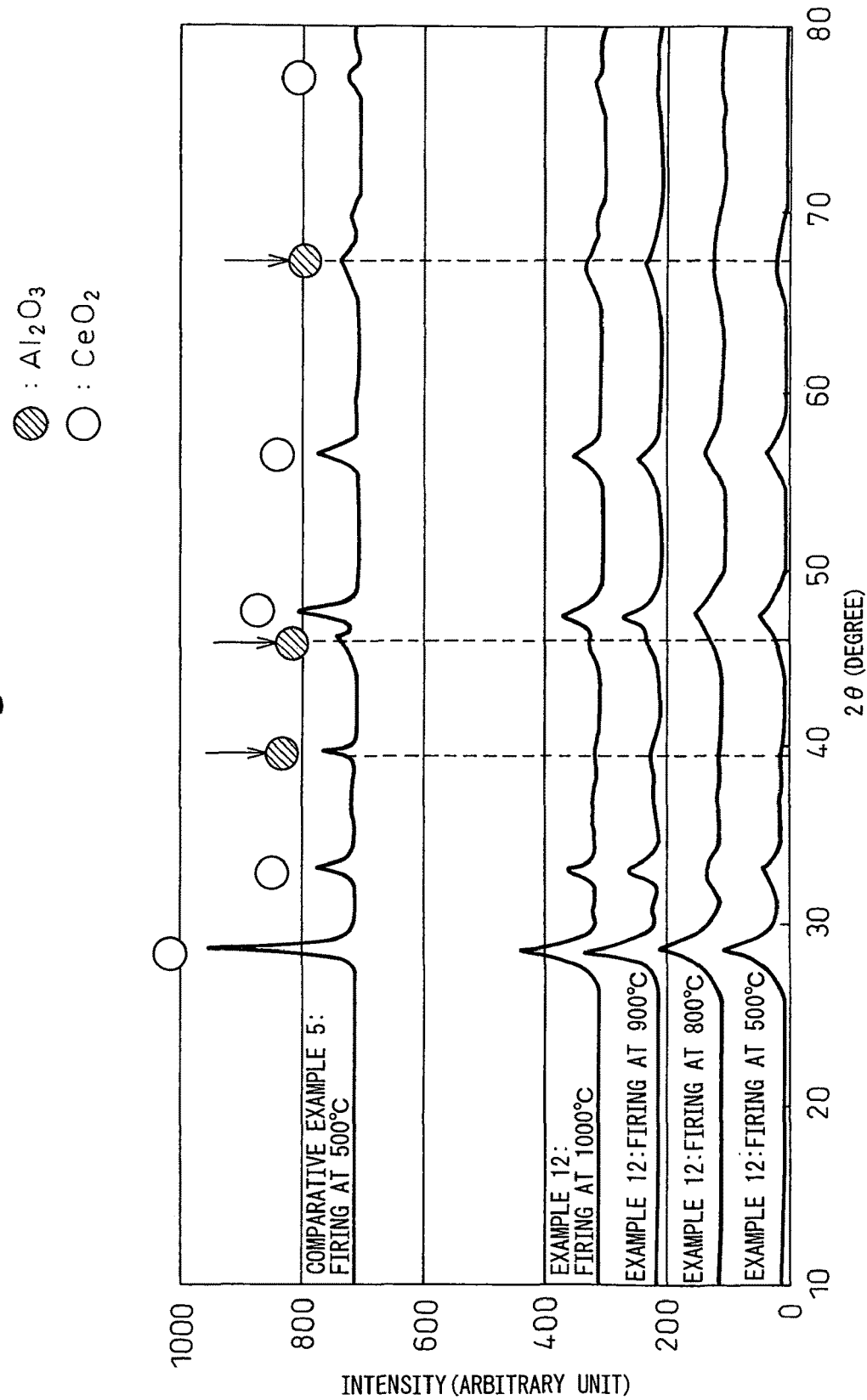
FIG. 12 is a view showing the XRD results of the catalyst support particles of Example 12 and Comparative Example 5.

The catalyst support particles of Example 12 and Comparative Examples 1 and 5 were evaluated using an X-ray diffraction (XRD) analysis. FIGS. 11 and 12 show the analysis results obtained by XRD. In all of the catalyst support particles of Example 12 and Comparative Examples 1 and 5, the mass ratio of $Al_2O_3:CeO_2$ is about 83:17.

FIG. 11 shows the XRD results of the catalyst support particles of Example 12 and Comparative Example 1. As seen from FIG. 11, in comparison with the XRD results of the catalyst support particle of Comparative Example 1, the peak of alumina is relatively not observed in the XRD results of the catalyst support particle of Example 12 and particularly, a prominent peak of alumina is not present in the vicinity of $2\theta=67°$.

This means that in the catalyst support particle of Example 12, an alumina phase is present in a relatively amorphous state. The alumina phase in such a relatively amorphous state is considered to allow a ceria precursor to precipitate earlier than an alumina precursor in the production of the catalyst support particle of Example 12 and inhibit crystallization of the alumina precursor when precipitated.

FIG. 12 shows the XRD results of the catalyst support particles of Example 12 and Comparative Example 5. However, in the catalyst support particle of Example 12 used here, the final firing temperature is varied in the range of 500 to 1,000° C. As seen from FIG. 12, in the catalyst support particle of Comparative Example 5, a distinct peak of alumina is confirmed at the initial stage and therefore, it is revealed that the alumina has high crystallinity from the beginning. On the other hand, in the catalyst support particle of Example 12, a peak of alumina is not confirmed until the firing temperature becomes 800° C. and this reveals that the alumina is in an amorphous state. In the catalyst support particle of Example 12, when the firing temperature becomes 900° C., a peak of alumina is confirmed particularly in the vicinity of $2\theta=46°$ and 67° and it is understood that the structure in an amorphous state starts being broken.

(Ceria Particle Diameter)

Figure 13:
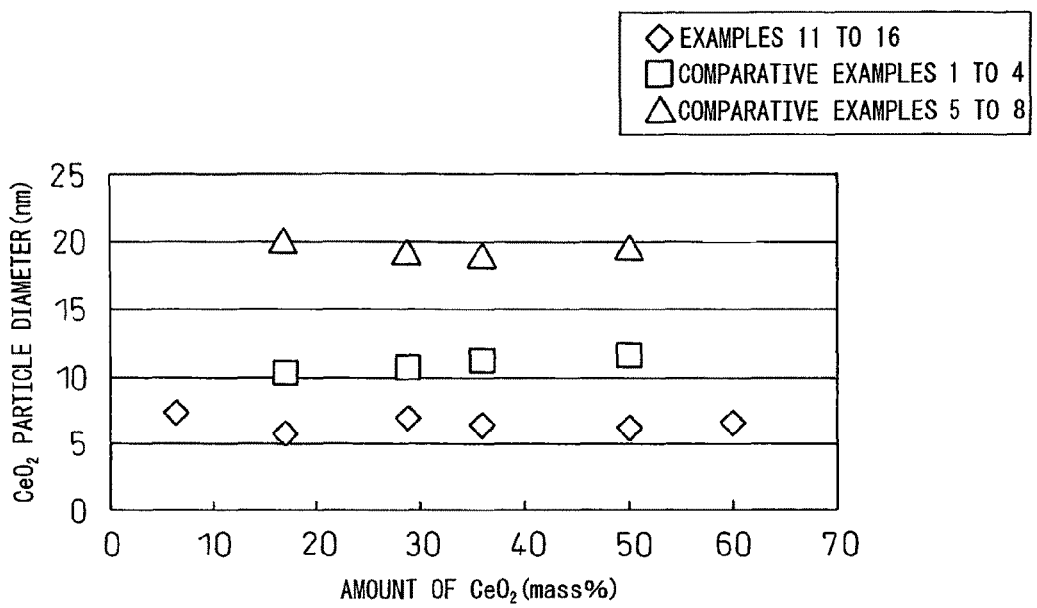
FIG. 13 is a view showing the ceria particle diameters of the catalyst support particles of Examples and Comparative Examples after endurance.

The catalyst support particles of Examples and Comparative Examples were subjected to endurance under heating in an electric furnace at 800° C. over 5 hours and thereafter, evaluated for the ceria particle diameter. In the evaluation of ceria particle here, an X-ray diffraction (XRD) analysis was used. FIG. 13 shows the evaluation results of ceria particle diameter.

As seen from FIG. 13, when compared with Comparative Examples 5 to 8 where an alumina particle with a high specific surface area and a ceria particle were mixed and the mixture was then fired, a small ceria particle diameter is apparently maintained in the catalyst support particles of Examples 11 to 16 where in the co-precipitation process, a ceria precursor was precipitated earlier than an alumina precursor. When compared with the catalyst support particles of Comparative Examples 1 to 4 where in the co-precipitation process, an alumina precursor was precipitated earlier than a ceria precursor, the catalyst support particles of Examples 11 to 16 of the present invention maintain a small ceria particle diameter, because in the exhaust gas purifying catalyst of the present invention, ceria is dispersed and held in an amorphous-state alumina.

(Platinum Particle Diameter)

Similarly to the evaluation of the ceria particle diameter, the catalyst support particles of Examples and Comparative Examples, which were subjected to endurance under heating in an electric furnace at 800° C. over 5 hours, were evaluated for the platinum particle diameter. The platinum particle diameter was calculated by utilizing a property such that carbon monoxide (CO) uniformly adsorbs only to platinum. FIG. 13 shows the evaluation results of platinum particle diameter.

Figure 14:
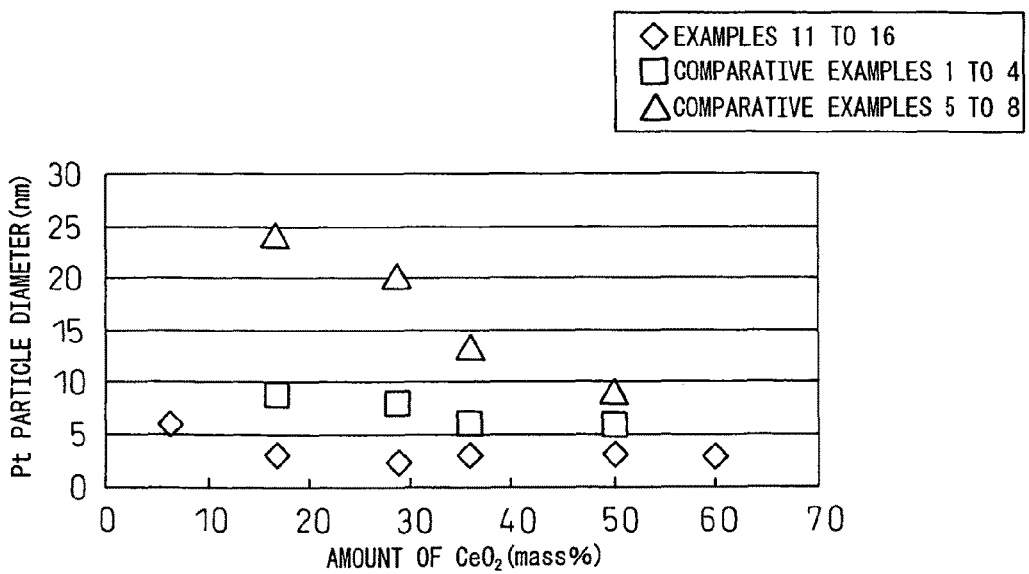
FIG. 14 is a view showing the platinum particle diameters of the catalyst support particles of Examples and Comparative Examples after endurance.

As seen from FIG. 14, in the catalyst support particles of Comparative Examples 1 to 8, particularly Comparative Examples 5 to 8, sintering of platinum is suppressed along with increase in the ceria content. This is considered to result because in the catalyst support particles of Comparative Examples, when the ceria particle diameter is large and the ceria content is small, the contact between platinum and ceria is insufficient and along with increase in the ceria content, the proportion of a platinum particle of which sintering is suppressed by the contact with ceria is increased. On the other hand, in the catalyst support particles of Examples, although the platinum particle diameter is relatively large at a ceria content of 6 mass %, the platinum particle diameter is nearly constant when the ceria content is 16 mass % or more, because in the catalyst support particles of Examples, ceria is satisfactorily dispersed and held and sintering of platinum is thereby sufficiently and successfully suppressed already at a ceria content of 16 mass %.

($NO_x$ Purification Percentage)

In order to evaluate the performance after endurance of the exhaust gas purification catalysts of Examples and Comparative Examples, the exhaust gas purifying catalysts of Examples and Comparative Examples each was formed into a 1 mm-square pellet shape, the catalyst thus-formed into a pellet shape was then heated in air at 800° C. over 5 hours and to this catalyst, gases for endurance each having a composition shown in Table 5 below were fed at 400° C. and a gas flow rate of 6.6 liters/min over 4 hours by switching the gases at rich gas/lean gas=4 minutes/1 minute.

TABLE 5

| | Composition of Gas for Endurance | | | | | | | | |
|---|---|---|---|---|---|---|---|---|---|
| | $CO_2$ (%) | $O_2$ (%) | CO (%) | $C_3H_6$ (ppm) | $H_2$ (%) | NO (ppm) | $SO_2$ (ppm) | $H_2O$ (%) | $N_2$ (—) |
| Rich Gas (corresponding to A/F = 12) | 11 | 0 | 6 | 1000 | 2 | 400 | 100 | 3 | bal. |
| Lean Gas (corresponding to A/F = 22) | 11 | 7 | 0 | 200 | 0 | 400 | 100 | 3 | bal. |

Figure 15:
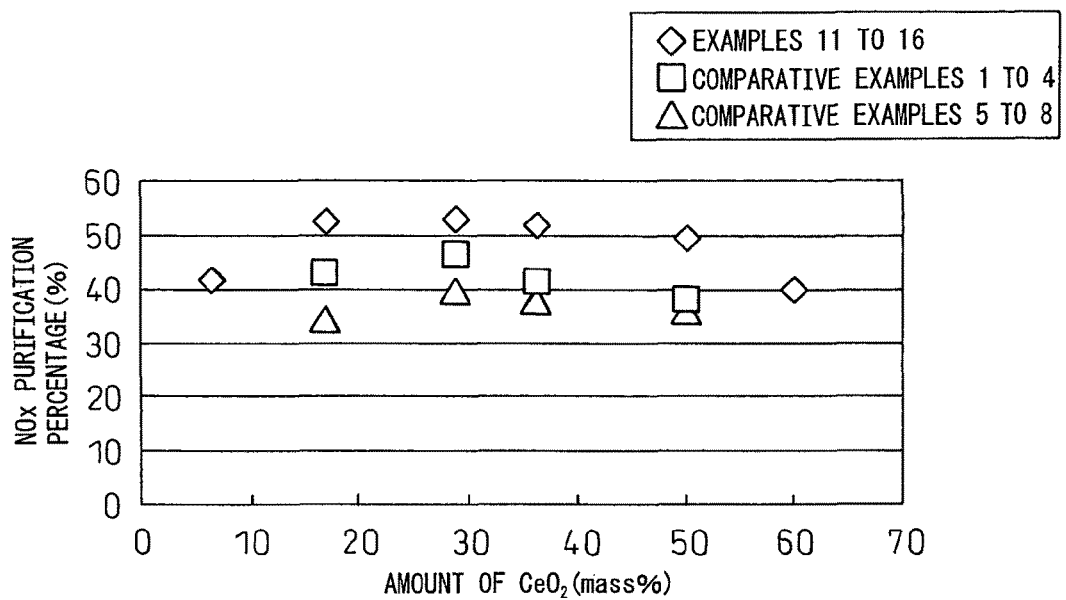
FIG. 15 is a view showing the $NO_x$ purifying performance of the exhaust gas purifying catalysts of Examples and Comparative Examples after endurance.

Each of the catalysts of Examples and Comparative Examples subjected to endurance above, in an amount of 1 g, was filled in a fixed bed flow-type reactor. To the reactor filled with the catalyst, a rich gas having a composition shown in Table 5 below was fed at 600° C. for 10 minutes and then, the $NO_x$ purification percentage was evaluated by feeding gases for evaluation of $NO_x$ purification percentage each having a composition shown in Table 6 below were fed at 400° C. and a gas flow rate of 6.6 liters/min while switching the gases at rich gas/lean gas=2 minutes/2 minutes. FIG. 15 shows the evaluation results of $NO_x$ purification percentage.

TABLE 6

Gas Composition for Evaluation of $NO_x$ Purification Percentage

| | $CO_2$ (%) | $O_2$ (%) | CO (%) | $C_3H_6$ (ppm) | NO (ppm) | $H_2O$ (%) | $N_2$ (—) |
|---|---|---|---|---|---|---|---|
| Rich Gas | 10 | 0.4 | 0.1 | 667 | 500 | 2 | balance |
| Lean Gas | 10 | 6.5 | 0.6 | 667 | 500 | 2 | balance |

As seen from FIG. 15, the catalysts of Examples exhibit a good $NO_x$ purifying performance as compared with the catalysts of Comparative Examples. This is considered to result because the catalysts of Examples maintain a relatively small particle diameter even after endurance.

Generally, in a ceria-containing catalyst, sintering of platinum can be prevented by increasing the ceria content. However, in the $NO_x$ purification using such a ceria-containing catalyst, along with increase in the ceria content, the amount of oxygen released by the oxygen storage capacity (OSC) of ceria at the feed of a rich gas increases, as a result, the reducing component in the rich gas is not used for the reduction of $NO_x$ but increasingly tends to be consumed by the oxygen. In the catalysts of the Examples and Comparative Examples, the $NO_x$ purification percentage is decreased according to this tendency after peaking in a ceria content of about 29% when the ceria content becomes larger than that. Out of the catalysts of Examples, a particularly preferred $NO_x$ purifying performance is obtained in the catalysts of Examples 12 to 15 where the ceria content is approximately from 17 to 50 mass %.

(Evaluation of Effect of Mixing Time on Ceria Particle Diameter)

Figure 16:
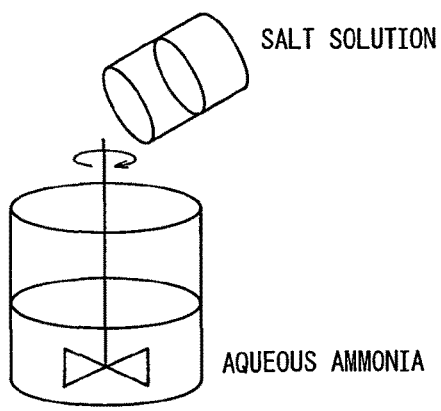
FIG. 16 is a view explaining the evaluation method of the relationship between the mixing time and the ceria particle diameter of the catalyst support particle.

The relationship between the time spent adding a salt solution of cerium and aluminum to aqueous ammonia under stirring as shown in FIG. 16 and the ceria particle diameter in the obtained catalyst support particle was evaluated. The catalyst support particles were obtained in the same manner as in Example 12 except that the time spent adding the salt solution to aqueous ammonia was varied.

Figure 17:
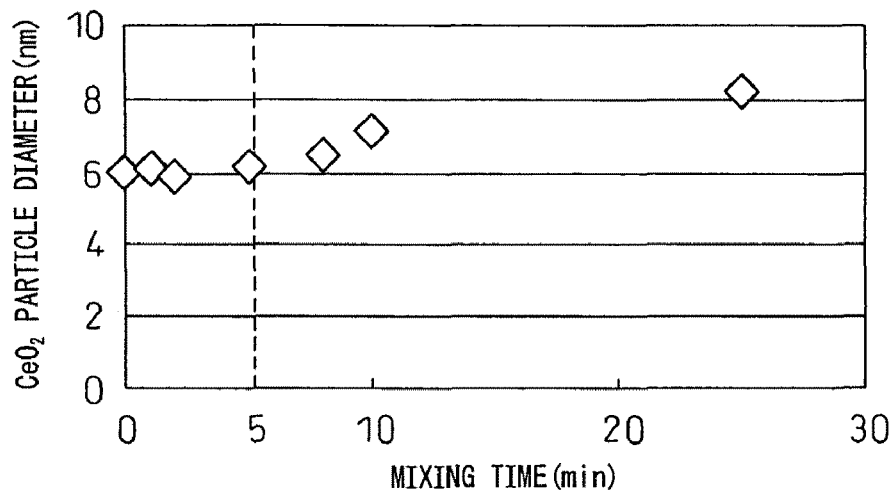
FIG. 17 is a view showing the relationship between the mixing time and the ceria particle diameter after endurance of the catalyst support particle.

The obtained catalyst support particles were subjected to endurance under heating in air at 800° C. over 5 hours and then evaluated for the ceria particle diameter. In this evaluation of ceria particle diameter, an X-ray diffraction (XRD) analysis was used. FIG. 17 shows the evaluation results regarding the change in the ceria particle diameter when the mixing time is varied.

As seen from FIG. 17, when the time spent adding the salt solution to aqueous ammonia exceeds 5 minutes, the ceria particle diameter after endurance of the obtained catalyst support particle becomes large. This means that the pH range in which only a ceria precursor precipitates before precipitation of an alumina precursor starts, i.e. the pH range where the pH shown in FIG. 3 is larger than about 10.8, needs to be passed through rapidly to a certain extent.

(Evaluation of Effect of pH Change Rate on Ceria Particle Diameter)

The effect of the time until the pH of the mixed solution lowers to 10.8, exercised on the ceria particle diameter after thermal endurance of the obtained catalyst support particle was evaluated. The catalyst support particle was obtained in the same manner as in Example 12 except that the time spent adding a salt solution of ceria and alumina to aqueous ammonia was varied.

Figure 18:
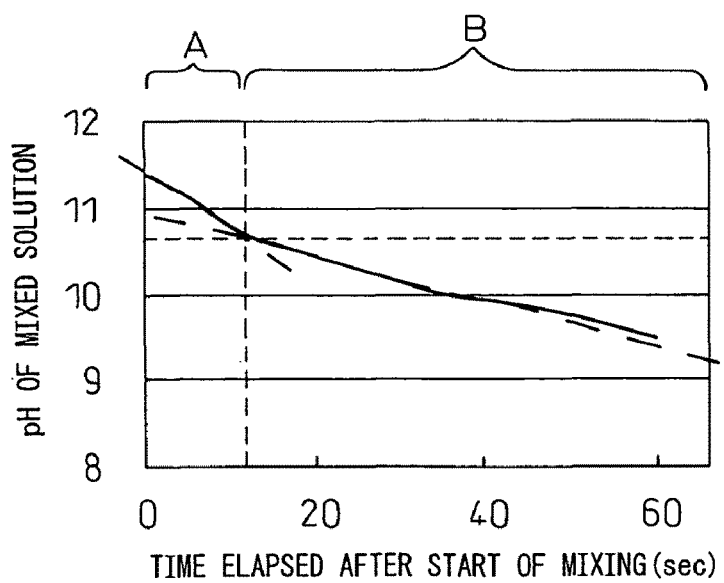
FIG. 18 is a view showing the relationship between the time elapsed after the start of mixing and the pH of the mixed solution.

The time until the pH of the mixed solution lowers to 10.8 means the time elapsed before pH becomes 10.8 (period A) in the graph of FIG. 18 showing the relationship between the time elapsed after the start of mixing and the pH of the mixed solution. Incidentally, in the graph of FIG. 18, the gradient of the curve showing the pH change differs between the period A in which the pH is 10.8 or more and the period B in which the pH is less than that, because in the period A where the pH is 10.8 or more, only ceria obtains a hydroxy group and precipitates as cerium hydroxide, whereas in the period B where the pH is less than 10.8, cerium and aluminum each obtains a hydroxy group and precipitates as a hydroxide. During the mixing shown in FIG. 18, the pH of the mixed solution was elevated from about 21° C. to about 23° C. due to heat of reaction.

Figure 19:
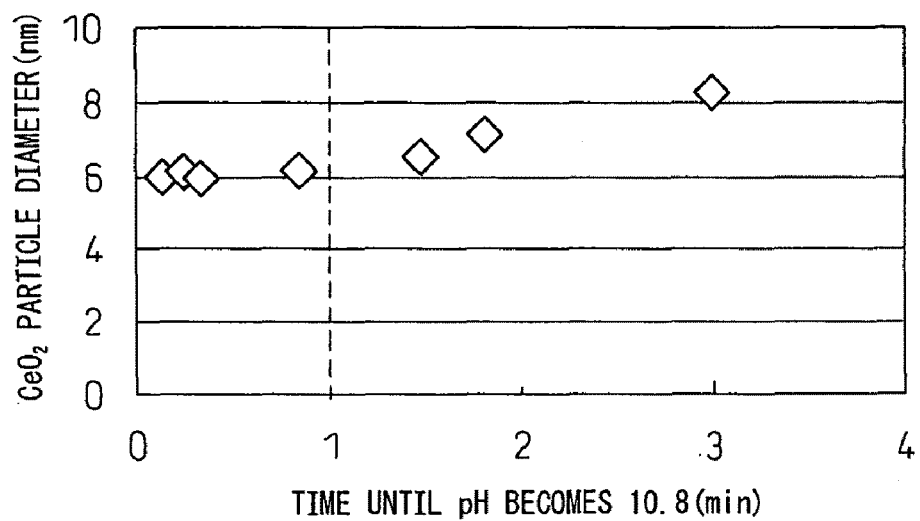
FIG. 19 is a view showing the relationship between the time elapsed after the start of mixing until the pH of the mixed solution becomes 10.8 and the ceria particle diameter after endurance of the obtained catalyst support particle.

The obtained catalyst support particle was subjected to endurance under heating in air at 800° C. over 5 hours and then evaluated for the ceria particle diameter. In this evaluation of the ceria particle diameter, an X-ray diffraction (XRD) analysis was used. FIG. 19 shows the evaluation results of the relationship between the time until the pH of the mixed solution lowers to 10.8 and the ceria particle diameter after thermal endurance of the obtained catalyst support particle.

As apparent from FIG. 19, when the time elapsed until the pH becomes 10.8 is 2 minutes or less, particularly 1 minute or less, the ceria particle diameter after thermal endurance of the obtained catalyst support particle is maintained small. Accordingly, in the case of obtaining the exhaust gas purifying catalyst of the present invention by adding a salt solution of cerium and aluminum to an alkaline solution, i.e. is, in the case of obtaining the catalyst support particle by causing the pH of the mixed solution of the alkaline solution and the salt solution to change from a large value to a small value, the time elapsed until the pH of the mixed solution lowers to 10.8 is preferably 2 minutes or less, particularly 1 minute or less.

(Evaluation of Relationship between Final pH of Mixed Solution and Initial Ceria Particle Diameter)

Figure 20:
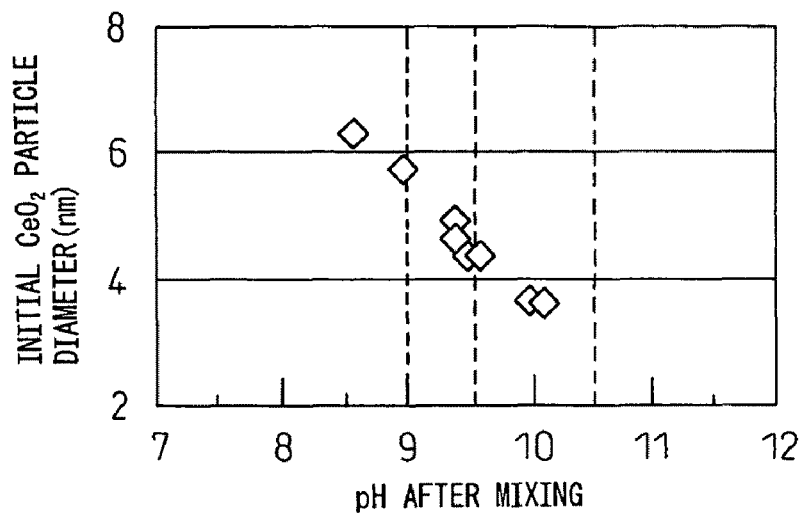
FIG. 20 is a view showing the relationship between the final pH of the mixed solution and the initial ceria particle diameter of the obtained catalyst support particle.

The effect of the final pH of the mixed solution of a salt solution of cerium and aluminum and an alkaline solution, exercised on the initial ceria particle diameter was evaluated. The catalyst support particle was obtained in the same manner as in Example 12 except that the final pH of the mixed solution was adjusted by varying the amount of aqueous ammonia used as the alkaline solution. FIG. 20 shows the evaluation results.

As seen from FIG. 20, when the final pH of the mixed solution is relatively large, a relatively small initial ceria particle diameter is obtained. In order to bring about precipitation of not only a ceria precursor but also an alumina precursor, the final pH of the mixed solution must be less than 10.8, and it is understood that the final pH of the mixed solution is preferably from 9.0 to 10.5, particularly from 9.5 to 10.5, for making small the initial ceria particle diameter of the obtained catalyst support particle.

The invention claimed is:
1. A process for producing a catalyst support particle, comprising:
adding an acidic salt solution containing a cerium salt and an aluminum salt to an alkaline solution having a pH value more than 11 and mixing said acidic salt solution and said alkaline solution to have a final pH of 9.0 to 10.8 and produce a precipitate containing cerium and aluminum, wherein cerium is first precipitated and aluminum is then precipitated, and drying and then firing at 800° C. or less the obtained precipitate to obtain a catalyst support particle.

2. The process as claimed in claim 1, wherein said acidic salt solution is added to said alkaline solution over 10 seconds to 10 minutes.

3. The process as claimed in claim 1, wherein said acidic salt solution and said alkaline solution are mixed to allow the mixed solution to reach a pH value less than 10.8 within 2 minutes after the start of addition of the acidic salt solution containing a cerium salt and an aluminum salt.

4. The process as claimed in claim 1, wherein said acidic salt solution and said alkaline solution are mixed to allow said mixed solution to reach a pH value less than 10.8 within from 10 seconds to 1 minute after the start of addition of said acidic salt solution.

5. The process as claimed in claim 1, wherein said alkaline solution is selected from the group consisting of an aqueous alkali metal or alkaline earth metal hydroxide solution, aqueous ammonia and an aqueous urea solution.

6. The process as claimed in claim 1, wherein said cerium salt and said aluminum salt each is selected from the group consisting of a chloride salt, a nitrate salt, an oxynitrate salt and an acetate salt.

7. A process for producing an exhaust gas purifying catalyst, comprising:

adding an acidic salt solution containing a platinum salt, a cerium salt and an aluminum salt to an alkaline solution having a pH value more than 11 and mixing said acidic salt solution and said alkaline solution to have a final pH of 9.0 to 10.8 and produce a precipitate containing platinum, cerium and alumina, wherein platinum and cerium are first precipitated and aluminum is then precipitated, and drying and then firing at 800° C. or less the obtained precipitate to obtain an exhaust gas purifying catalyst.

8. The process as claimed in claim 7, wherein said acidic salt solution is added to said alkaline solution over 10 seconds to 10 minutes.

9. The process as claimed in claim 7, wherein said alkaline solution is selected from an aqueous alkali metal or alkaline earth metal hydroxide solution, aqueous ammonia and an aqueous urea solution.

10. The process as claimed in claim 7, wherein said cerium salt and said aluminum salt each is selected from the group consisting of a chloride salt, a nitrate salt, an oxynitrate salt and an acetate salt.

11. The process as claimed in claim 7, wherein said platinum salt is selected from the group consisting of dinitrodiammine platinum, tetrachloroplatinum, hexachloroplatinum, platinum nitrate and tetraamminedichloroplatinum.

* * * * *